June 23, 1959 — P. SEITZ — 2,891,379

SHOCK-ABSORBING BEARING

Filed Dec. 14, 1954

Inventor:
Pierre Seitz
by:
Michael S. Striker

United States Patent Office 2,891,379
Patented June 23, 1959

2,891,379

SHOCK-ABSORBING BEARING

Pierre Seitz, Les Brenets, Switzerland

Application December 14, 1954, Serial No. 475,077

Claims priority, application Switzerland
December 17, 1953

2 Claims. (Cl. 58—140)

This invention relates to shock-absorbing bearings for protecting the pivots of the most delicate elements in watches, apparatus and the like.

Bearings are known in the art, which comprise two separate elements, one of which formed by a pierced jewel and the other including a cap jewel, said two elements being held in place within a body member by a return-spring, the pierced jewel thereby resting on a conical seat of the body member.

However, most of these bearings have the drawback that the oil drop between both jewels is torn by such shocks which thrust the two elements of the bearing away from each other. It has indeed been observed after the oil drop has been torn some times as described, that the oil disappears from the jewels.

It is, therefore, one object of the invention to improve a bearing of the type described by providing it so that the pierced and the cap members always remain closely together under the action of a shock.

For this purpose, the return-spring acts axially on the cap member which bears in turn on a peripheral portion of the pierced member so that the reactions which act on the pierced member, in case of a radial impact of the pivot journalled in the bearing, thrust said pierced member against the cap member.

Other objects of the invention will appear in the course of the following description.

In the drawings annexed to this specification and forming a part thereof, one embodiment of the bearing according to the invention is represented diagrammatically and by way of example.

Figure 1:
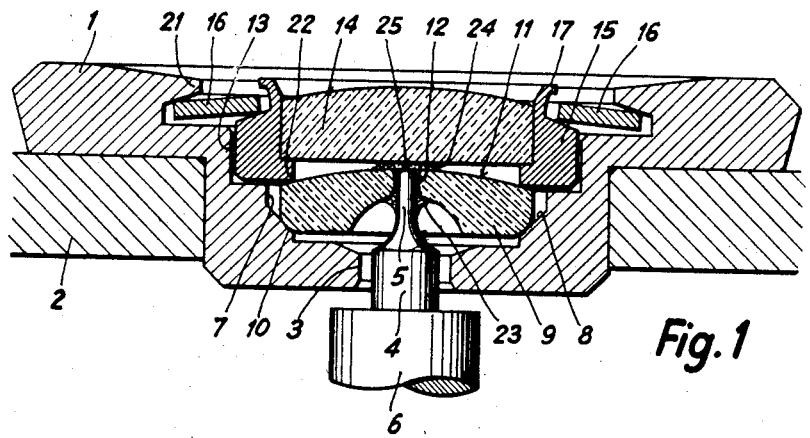
Fig. 1 is a diametrical section of this embodiment, the elements of the bearing being in their normal position.

The bearing represented in Fig. 1 journals the upper pivot of a balance-wheel shaft of a watch. It comprises a body member 1 constituted by an end piece pressed with force fit into a corresponding bore of a cock 2. This body member is provided with a central opening 3 through which the shank 4 and the pivot 5 of the balance-wheel shaft 6 may be engaged. The diameter of the opening 3 is somewhat larger than that of the shank 4 which is normally located within said opening, as shown in Fig. 1.

A lodging 7 is further provided in the body 1, so that the lower portion 8 of the wall of this lodging is trunconical, the opening angle of this conical surface portion being about 90°. The lodging 7 is intended for locating a pierced jewel 9. The lower outer edge of this jewel 9 is bevelled so as to form a convex surface of revolution 10 coaxial to the jewel. The upper face 11 of this jewel 9 is convex and its central bore 12 has a wall substantially in form of a right hyperboloid as usual.

Figure 3:
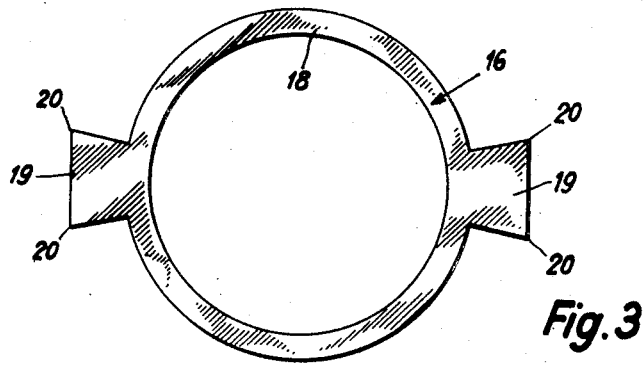
Fig. 3 shows a detail of the bearing.

A second lodging 13 is provided in the body member 1 for locating a cap member constituted by a jewel 14 fixed within an annular setting 15. A spring 16 (Figs. 1 and 3) is permanently fixed to the setting 15, however with a certain amount of shake, by a riveting 17 of said setting 15. The spring 16 is constituted by a ring 18 made integral with two diametrically opposite tongues 19. These fish-tail shaped tongues bear on the body member 1 at four points 20 when they are engaged under an annular internal rim 21 of the body 1.

As shown in Fig. 1, the setting 15 bears in turn by its lower inner edge 22 on the peripheral portion of surface 11 of the pierced jewel 9, thus maintaining the latter normally in the position represented in Fig. 1. In this position, it will be observed that the forms both of the pierced jewel 9 and of the setting 15 are so chosen, that the circle along which the setting 15 rests on surface 11, is situated substantially in the same plane as the smallest circle of the wall of the central bore 12, with which the cylindrical pivot 5 comes into contact. Furthermore the pierced jewel 9 has such a shape that both circles—that along which the setting 15 contacts the pierced jewel and that along which the convex face 10 of the jewel 9 contacts the conical seat of the body 1—extend in parallel to each other, have substantially the same diameter and are coaxial.

The oil drop 23, which lubricates those parts of the jewels with which the pivot 5 may come into contact, has normally in the capillary space between the jewels the form shown in Fig. 1 under the effect of the surface tension.

Figure 2:
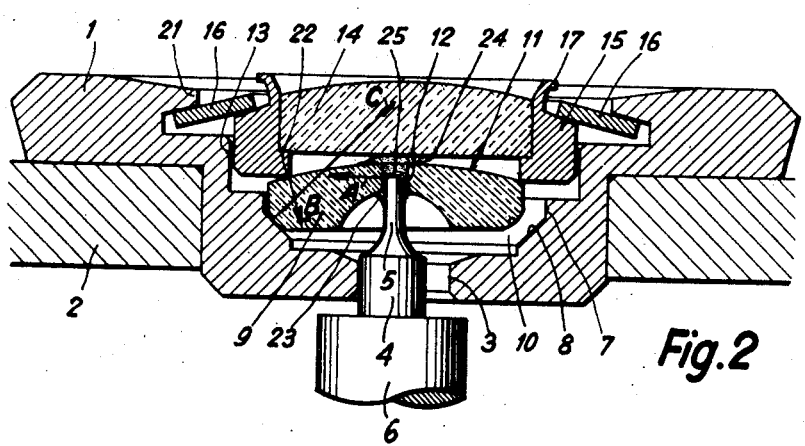
Fig. 2 is a view analogous to that of Fig. 1 but in which the movable elements of the bearing are in a removed position.

In order to damp a radial impact of the shaft 6, the two members comprising the jewels 9 and 14, move so far away from the position represented in Fig. 1 as shown in Fig. 2 in which the shank 4 of shaft 6 butts against the cylindrical wall of the central opening 3 of body 1. When comparing this position with that of Fig. 1, it will be observed that the pierced jewel 9 is still in contact with the setting 15 of the cap member along its whole periphery, this cap member having merely moved upwards vertically. With other words the pierced jewel 9 has moved with respect to the cap member like a knee-joint, since the convex surface 11 of the pierced jewel 9, which is substantially spherical, has turned within the circle defined by the edge 22 of the setting 15. The distance between the two jewels 9 and 14 has accordingly not been modified during said displacement. It means for the oil drop 23 that the form of its meniscus 24 comprised between both jewels will not be modified materially. This meniscus has in Fig. 1 the form of a right hyperboloid and in Fig. 2 the form of an oblique hyperboloid, because the surface area of the pierced jewel 9 to which the oil drop is attached, has moved laterally with respect to the surface area of the jewel 14 to which the oil drop is attached likewise.

It could be assumed that this relative transversal movement of the jewels injures pivot 5, if its end face 25 just butts against the jewel 14 during this movement, because this end face 25 would then be subjected to strong friction. Comparative tests have therefore been made with the bearing described and bearings in which the pierced jewel and the cap jewel are carried by the same metallic setting. These tests have shown that with the latter bearings, in which the end of the pivot always remains in contact with the cap jewel at the same point, the oil disappears more and more from the end face of the pivot, until this face becomes completely dry. The cap jewel also becomes dry in the very small area with which the pivot comes into contact. With the bearing described, the same test has shown that this phenomenon is excluded because the pivot moves laterally with respect to the cap jewel, thus stirring up the oil of the drop 23. The end face 25 of the pivot was always lubricated satisfactorily and it did not show any unusual wear.

The reasons for which the pierced jewel always remains in contact with the setting of the cap member during a radial impact of the pivot, cannot be appreciated by strictly taking into account, on the one hand, the elastical deformations of the material which the elements of the bearing described consist of, and, on the other hand, all the forces involved. It appears, however, that the described form of the pierced jewel 9 is such that, on the one hand, the action of pivot 5 and, on the other hand, the reactions of the body member 1 and of the setting 15 have the same result as a couple or momentum which always thrusts the jewel 9 against the setting 15. When considering only the components of said forces, which are situated in the plane of Fig. 2 and if it is assumed that the impact of shaft 6 also occurs in the direction of this plane, it will be observed that the force A, which represents the action of pivot 5 on to the pierced jewel 9, goes through the point at which the edge 22 contacts the pierced jewel. The form of the jewel 9 has indeed been so chosen that the circle along which the edge 22 of the setting 15 bears against the pierced jewel 9 lies substantially in the same plane as the smallest circle of central bore wall 12. Furthermore the setting 15 exerts on the jewel 9 a reaction force B which is normal to the convex face 11 of the jewel 9. Eventually the body member 1 exerts a reaction force C on this jewel 9, which is normal to the surface of revolution 10 of the jewel 9. Now, since the forces A and B go through the point at which the edge 22 contacts the pierced jewel 9, and since the reaction C passes to the right of that point in the drawing, this reaction C produces, with respect to said point of contact considered as fulcrum, a momentum which urges the pierced jewel 9 against the setting 15. In order to prevent the cap member swinging or tilting under the action of this momentum, the spring 16 is so arranged that it compensates this momentum. Since this spring 16 bears against the body member 1 at four points 20, the reactions of the bearing are substantially isotropic with regard to radial impacts.

In the case of an axial impact of the shaft 6, the cap member yields under the action of pivot 5 and moves vertically upwards in Fig. 1. The oil drop 23, because of its surface tension, pulls the rather light jewel 9 with the cap member, thus also avoiding to get torn.

In case of a shock in any other direction, the two effects described hereabove combine themselves so that the movable elements of the bearing always remain at the same distance apart one from the other, without tearing the oil drop.

It is to be understood that the form of the present invention, herewith shown and described, is to be taken as a preferred example of the same, and that various changes in the shape, size and arrangement of parts may be resorted to, without departing from the spirit of my invention, or the scope of the subjoined claims.

I claim:

1. A shock absorbing bearing for journalling a pivot, comprising, in combination, a body member formed with an opening therethrough extending from a top face to a bottom face of said body member, said body member having at said opening an inner stepped surface which comprises a first cylindrical surface portion of said body member, a second cylindrical surface portion of lesser diameter than said first cylindrical surface portion adjacent and beneath the latter, said first and second cylindrical surface portions defining between themselves an upwardly facing annular shoulder, and a frusto-conical surface portion beneath and adjacent said second cylindrical surface portion and located between the latter and said bottom face of said body member, the greatest diameter of said frusto-conical surface portion being substantially equal to the diameter of said second annular surface portion, said frusto-conical surface portion converging towards said bottom face of said body member; a disc formed substantially centrally with an axial aperture therethrough of non-uniform diameter which is smallest closely adjacent to but below the upper surface of said disc and said disc having a lower peripheral edge lower than the smallest part of said aperture adjacent the under surface of said disc bevelled to form a convex surface of revolution coaxial to said disc, the upper surface portion of said disc being a portion of a sphere, the diameter of said disc being less than the diameter of said second cylindrical surface portion, said disc being arranged coaxially with said frusto-conical surface portion, said disc engaging at its lower bevelled peripheral edge said frusto-conical surface portion, the thickness of the outer peripheral edge of said disc being at least as great as the distance between the place of engagement of said disc and said frusto-conical surface portion and said shoulder, there being an annular space between the peripheral edge of said disc and said second cylindrical surface portion; a cap member including a ring-shaped support portion located in said opening above said shoulder and engaging with its inner lower peripheral edge said convex surface of said disc and being arranged coaxially therewith, the outer diameter of said support portion being only slightly less than the diameter of said first annular surface portion, and said cap member including a disc portion having a plane lower face fixed to said support portion coaxially with and immediately above said disc, there being a capillary space between the lower face of said disc portion of said cap member and the topmost portion of the upper surface portion of said disc; and spring means engaging said support portion of said cap member for urging the same axially downwards against said disc.

2. A shock absorbing bearing for journalling a pivot, comprising, in combination, a body member formed with an opening therethrough extending from a top face to a bottom face of said body member, said body member having at said opening an inner stepped surface which comprises a first cylindrical surface portion of said body member, a second cylindrical surface portion of lesser diameter than said first cylindrical surface portion adjacent and beneath the latter, said first and second cylindrical surface portions defining between themselves an upwardly facing annular shoulder, and a frusto-conical surface portion beneath and adjacent said second cylindrical surface portion and located between the latter and said bottom face of said body member, the greatest diameter of said frusto-conical surface portion being substantially equal to the diameter of said second annular surface portion, said frusto-conical surface portion converging towards said bottom face of said body member; a first disc formed substantially centrally with an axial aperture therethrough of non-uniform diameter which is smallest closely adjacent to but below the upper surface of said disc and said disc having a lower peripheral edge lower than the smallest part of said aperture adjacent the under surface of said first disc bevelled to form a convex surface of revolution coaxial to said first disc, the upper surface portion of said first disc being a portion of a sphere, the diameter of said first disc being less than the diameter of said second cylindrical surface portion, said first disc being arranged coaxially with said frusto-conical surface portion, said first disc engaging at its lower bevelled peripheral edge said frusto-conical surface portion, the thickness of the outer peripheral edge of said first disc being at least as great as the distance between the place of engagement of said first disc and said frusto-conical surface portion and said shoulder, there being an annular space between the peripheral edge of said first disc and said second cylindrical surface portion; a ring-shaped support member located in said opening above said shoulder and engaging with its inner lower peripheral edge said convex surface of said first disc and being arranged coaxially therewith, the outer diameter of said support member being only slightly less than the diameter of said first annular surface portion; a second disc having a plane lower face supported in said support member coaxially with and immediately above said first disc, there being a capillary space between the lower face of said second disc and the topmost portion of the upper surface portion of said first disc; and spring means engaging said support member for urging the same axially downwards against said first disc.

References Cited in the file of this patent

FOREIGN PATENTS

| | | |
|---|---|---|
| 984,582 | France | Feb. 28, 1951 |
| 1,050,566 | France | Sept. 2, 1953 |